United States Patent
Kim (10) Patent No.: US 6,172,659 B1
(45) Date of Patent: Jan. 9, 2001

(54) DATA INTERFACING APPARATUS OF A FLAT PANEL DISPLAY

(75) Inventor: Se-Yong Kim, Seoul (KR)

(73) Assignee: Daewoo Electronics Co., Ltd., Seoul (KR)

(*) Notice: Under 35 U.S.C. 154(b), the term of this patent shall be extended for 0 days.

(21) Appl. No.: 09/069,963

(22) Filed: Apr. 30, 1998

(30) Foreign Application Priority Data

Apr. 30, 1997 (KR) .................................................. 97-16690
Jun. 20, 1997 (KR) .................................................. 97-25970

(51) Int. Cl.$^7$ ...................................................... G09G 3/10
(52) U.S. Cl. ............................................. 345/42; 345/211
(58) Field of Search .................................. 345/42, 60, 98, 345/100, 211–213, 204, 103

(56) References Cited

U.S. PATENT DOCUMENTS 5,541,618 * 7/1996 Shinoda .................................. 345/60
5,583,527 * 12/1996 Fujisaki et al. ........................ 345/55

* cited by examiner

Primary Examiner—Vijay Shankar
Assistant Examiner—Vanel Frenel
(74) Attorney, Agent, or Firm—Smith, Gambrell & Russell, LLP (57) ABSTRACT

An apparatus for L pixel data corresponding to 1 line input from a memory section to an upper and a lower address electrode driving sections, respectively in response to a control signal supplied from a timing control section. The data interfacing apparatus includes upper and lower data interfacing sections, and an input/output control section. The upper and the lower data interfacing sections includes a couple of temporality storing sections including a storing area for temporarily storing L/2 pixel data, an input selecting section for inputting 3N pixel data into the storing area over M (where M is a least integer which is greater than quotient of L divided by 3N) times in response to M input selecting control signals which are sequentially generated, and an output selecting section for outputting the L/2 pixel data stored in the storing area by P units over Q $\{=(L/2)/P\}$ times in response to Q output selecting control signals which are sequentially generated, respectively.

21 Claims, 5 Drawing Sheets

DATA INTERFACING APPARATUS OF A FLAT PANEL DISPLAY

BACKGROUND OF THE INVENTION

1. Field of the Invention

The present invention relates to a flat panel display apparatus, and more particularly, relates to a video data processing in which video data is processed by a flat panel display apparatus adopting a red-green-blue strip-type plasma display panel and in which the interfaces pixel data from a memory to an address electrode drive section.

2. Description of the Prior Art

Currently, as television sets (hereinafter, referred to as "TV") have become more widely used, consumers are demanding slim display apparatuses which have wide screens and which are easily installable. In view of consumers' needs, the existing cathode ray tube (referred to as "CRT") has started to reveal limitations thereof. Thus, the existing display equipment such as the CRT has come to be replaced by a so-called flat panel display (hereinafter, referred to as "FPD") apparatus that has a wide display area and that is slim as well. Further, recently, research projects therein are in progress enthusiastically at home and abroad.

This kind of the FPD device is largely divided into an emissive device and a non-emissive device. The emissive device is usually called an active emitting device and is a device which emits a light by itself. Representative examples of the emissive device are a field emission display (referred to as "FED") device, a vacuum fluorescent display (referred to as "VFD") type device, an electro-luminescence (referred to as "EL") type device, a plasma display panel (hereinafter, referred to as "PDP") and the like. The non-emissive device is called a passive light emitting device, and representative examples of the non-emissive device are a liquid crystal display (referred to as "LCD") device, an electro-chromic display (referred to as "ECD"), an electro-phoretic image display (referred to as "EPID") and the like.

Currently, the LCD device occupies the main stream in products such as desk clocks, calculators, lap-tops and the like. However, when this device is adopted to television sets having the screen size of 21 inches and over, it also shows the limitations up to now due to problems in a manufacturing process of a panel and in obtaining an acceptable product. Further, it has the disadvantages of having a narrow visual field angle and of having a response rate which is subject to a temperature variation. Recently, the PDP is newly attracting public attention as the flat panel display of the next generation which is capable of solving the problems of the LCD device.

Because the PDP emits a light by itself in a principle which is similar to that of a fluorescent lamp, it has a uniform brightness and a high contrast although a screen area is as wide as the screen area of the CRT. In addition, the PDP has a visual field angle of 140 degrees and above, and is well-known as the best wide screen display device which has a screen size of 21 to 55 inches. The panel manufacturing process of the PDP is simplified as compared with that of the LCD device and thereby saves a manufacturing cost. However, because the manufacturing cost of the PDP is more than that of the CRT, manufacturers are carrying out searches to reduce the manufacturing cost.

The plasma display is largely classified into a direct current (referred to as "DC") type and an alternating current (referred to as "AC") type according to a structural difference of a discharge cell thereof and a form of a driving voltage based on the structural difference. The DC type is driven by a DC voltage, whereas the AC type is driven by a sinusoidal AC voltage or by a pulse voltage. The AC type includes such a structure that a dielectric layer covers an electrode to serve as a current regulation resistor, whereas the DC type includes such a structure that an electrode is exposed to a discharge room as it is and that a discharge current comes to flow during a supply of the discharge voltage. Because the AC type has the electrode which is covered with the dielectric, it is more durable than the DC type. The AC type has a further advantage in that a wall electric charge which is generated on a surface of the dielectric as a result of a polarization, causes the cell to have a memory function therein, and is more applicable in the field of display devices than the others.

A color PDP includes a structure of 3 terminals wherein a special electrode is installed in order to improve discharge characteristics thereof. Namely, the 3-terminal structure comprises 3 electrodes per unit cell for display which are an address electrode for entering data, a maintenance electrode for sequentially scanning a line and for maintaining a cell discharge, and a bus electrode for helping a discharge maintenance.

A number of the address electrode for entering data is determined in accordance to a horizontal resolution. For example, in the case where a number of samples per line is 853 for each of the red, green and blue colors, a total number of the samples comes to 2559. Therefore, a required number of the address electrodes is also 2559. In the case where an arrangement of the address electrode has a strip form, red, green and blue electrodes are arranged repeatedly.

As described above, because a circuit arrangement of an electrode driving section is restricted considering a space utilization when thousands the address electrodes are arranged on one side, an upper and lower electrode driving system is adapted wherein the section for driving 1280 electrodes, which are ordered in an odd-numbered sequence, are arranged at an upper end portion of a panel whereas the section for driving 1279 electrodes, which are ordered in an even-numbered sequence, are arranged at a lower end portion thereof (refer to U.S. Pat. No. 4,695,838).

Meanwhile, in order to display a TV signal of a system of national television system committee (hereinafter, referred to as "NTSC") on the PDP, a data processing section converts an interlaced scanning system into a sequential scanning system, and also converts data into data of a subfield system for a PDP contrast processing. Further, the data processing section provides 1280 red-green-blue (hereinafter, referred to as "RGB") pixel data per line to the electrode driving section for driving the upper and lower address electrodes of the panel of the PDP in harmony with the arrangement of the address electrode.

Conventionally, a video data processing section of the PDP comprises a data rearranging section for rearranging digital RGB sample data into subfield data for a contrast processing, a frame memory section for converting one scanning system into the other, a data interfacing section, and a timing control section. In particular, the data interfacing section provides previously-latched 2559 pixel data to the upper and lower electrode driving sections in harmony with the arrangement of the upper and lower electrodes while latching 2559 pixel data corresponding to 1 line which is supplied from the memory section. The data interfacing section is configured with an application specific integrated circuit (referred to as "ASIC"), and includes 5118 data latches for storing the pixel data corresponding to 2 lines, a demultiplexer for a data input, and a multiplexer for a data output.

Therefore, because 12 bits of input data have to be loaded over 107 times in a memory region for the upper address electrode of the data interfacing section, input terminals have to be selectively connected to 12 1-bit-latches every time. Also, as 80 bits of data have to be outputted over 16 times, 80 1-bit-latches have to be selectively connected to output terminals every time. Namely, 1280 input line patterns are selectively connected to the 12 input terminals and 1280 output line patterns are selectively connected to the 80 output terminals.

As described above, the data interfacing section receives 107 input selecting control signals from the timing control section in order to temporarily store data corresponding to 1 line supplied from the memory section by 12 bits over 107 times in a corresponding storing place. Also, the data interfacing section receives 16 output selecting control signals from the timing control section in order to output the stored data by 80 bits over 16 times to the electrode driving section.

Therefore, the data interfacing section requires 123 external contact pins for inputting or for outputting the above described input/output selecting control signal. Accordingly, in a case of ASIC configuration, it requires a great deal of time and effort to design the circuit due to a large amount of input/output pins. Furthermore, the problem has been pointed out concerning the large size of integrated circuits because a large amount of bonding pads are placed around the rim of the integrated circuit.

SUMMARY OF THE INVENTION

Therefore, in order to settle the problems of the prior art as described above, it is an object of the present invention to provide a data interfacing apparatus of a flat panel display apparatus that can simplify connection lines between the data interfacing section and a timing control section and can simplify an inside circuit design by reducing a number of input pins of the data interfacing section.

In order to achieve the above object, the present invention provides a first apparatus for interfacing L pixel data corresponding to 1 line inputted from a memory section to an upper and a lower address electrode driving sections, respectively in response to a control signal supplied from a timing control section, which comprises:

an upper and a lower data interfacing sections, and an input/output control section;

wherein each of the upper and the lower data interfacing sections comprises:

a couple of temporality storing sections comprising a storing area for temporarily storing L/2 pixel data;

an input selecting means for inputting 3N pixel data into said storing area over M (where M is a least integer which is greater than a quotient of L divided by 3N) times in response to M input selecting control signals which are sequentially generated; and an output selecting means for outputting the L/2 pixel data stored in the storing area by P units over Q {=(L/2)/P} times in response to Q output selecting control signals which are sequentially generated;

wherein the input/output control section comprises:

a first control signal generating section for receiving a first clock signal and a first reference signal from the timing control section and for generating the M input selecting control signals by shifting the first reference signal over M times in response to the first clock signal;

a second control signal generating section for receiving a second clock signal and a second reference signal from the timing control section and for generating the Q output selecting control signals by shifting the second reference signal over Q times in response to the second clock signal; and an operation mode control section for supplying the control signal from the first and the second control signal generating sections to the couple of temporality storing sections for a data input/output mode to be alternately executed in the couple of temporality storing section in response to an input/output mode control signal.

Hereat, generating the input/output mode control signal by inputting read address clock of memory section contributes in making the logic configuration of timing control section simpler than generating the input/output mode control signal in accordance with the read timing of the memory section at the timing control section.

Accordingly, the first apparatus of the present invention can reduce a number of input pins for control signals from 139 to 5 in contrast to a method which directly receives 107 input selecting control signals and 32 output selecting control signals from the timing control section. Therefore, a line pattern between the timing control section and the data interfacing section is simplified.

In order to achieve the above object, the present invention provides a second apparatus for interfacing L pixel data corresponding to 1 line inputted from a memory section to an upper and a lower address electrode driving sections, respectively in response to a control signal supplied from a timing control section, which comprises:

an upper and a lower data interfacing sections, and an input/output control section;

wherein each of the upper and the lower data interfacing sections comprises:

a couple of temporality storing section comprising a storing area for temporarily storing L/2 pixel data;

an input selecting means for inputting 3N pixel data into the storing area over M (where M is a least integer which is greater than a quotient of L divided by 3N) times in response to M input selecting control signals which are sequentially generated; and an output selecting means for outputting the L/2 pixel data stored in the storing area by P units over Q {=(L/2)/P} times in response to Q output selecting control signals which are sequentially generated;

wherein the input/output control section comprises:

a first control signal generating section for decoding M first count values which are sequentially generated from said timing control section and for generating the M input selecting control signals;

a second control signal generating section for decoding Q second count values which are sequentially generated form the timing control section and for generating the Q output selecting control signals; and an operation mode control section for supplying the control signal from the first and the second control signal generating sections to the couple of temporality storing sections for a data input/output mode to be alternately executed in the couple of temporality storing section in response to an input/output mode control signal.

Accordingly, the second apparatus of the present invention can reduce a number of input pins for control signals from 139 to 13 in contrast to a method which directly receives 107 input selecting control signals and 32 output selecting control signals from the timing control section.

In order to achieve the above object, the present invention provides a third apparatus for interfacing L pixel data corresponding to 1 line inputted from a memory section to an upper and a lower address electrode driving sections, respectively in response to a control signal supplied from a timing control section, which comprises:

an upper and a lower data interfacing sections, and an input/output control section;

wherein each of the upper and the lower data interfacing sections comprises:

a couple of temporality storing sections comprising a storing area for temporarily storing L/2 pixel data;

an input selecting means for inputting 3N pixel data into the storing area over M (where M is a least integer which is greater than a quotient of L divided by 3N) times in response to M input selecting control signals which are sequentially generated; and an output selecting means for outputting the L/2 pixel data stored in said storing area by P units over Q $\{=(L/2)/P\}$ times in response to Q output selecting control signals which are sequentially generated;

wherein the input/output control section comprises:

a first control signal generating section for receiving a first clock signal and a first enable signal from said timing control section and for counting the first clock signal in response to the first enable signal and for generating the M input selecting control signals by decoding the counted value of the first clock signal;

a second control signal generating section for receiving a second clock signal and a second enable signal from the timing control section and for counting the second clock signal in response to the second enable signal and for generating the Q output selecting control signals by decoding the counted value of the second clock signal; and an operation mode control section for supplying the control signal from the first and the second control signal generating sections to said couple of temporality storing sections for a data input/output mode to be alternately executed in said couple of temporality storing sections in response to an input/output mode control signal.

Accordingly, the third apparatus of the present invention can reduce a number of input pins for control signals from 139 to 5 in contrast to a method which directly receives 107 input selecting control signals and 32 output selecting control signals from the timing control section.

BRIEF DESCRIPTION OF THE DRAWINGS

The above objects and other advantage of the present invention will become more apparent by describing in detail a preferred embodiment thereof with reference to the attached drawings, in which.

DESCRIPTION OF THE PREFERRED EMBODIMENT

A description will be given below in detail with reference to accompanying drawings to a configuration and an operation of a flat panel display apparatus and a method for processing video data thereof according to embodiments of the present invention.

Figure 1:
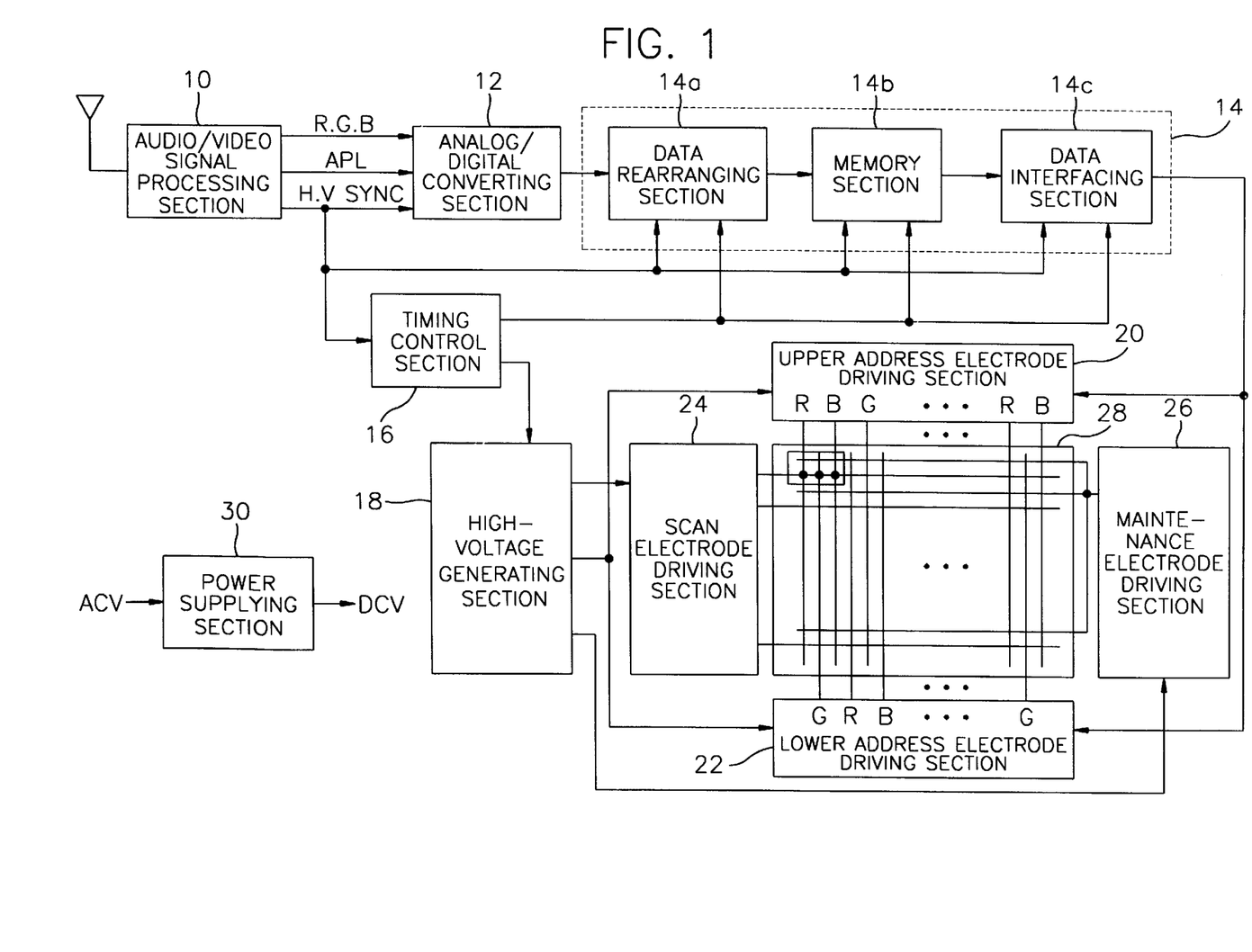
FIG. 1 is a block diagram for showing a circuit configuration of a plasma display panel television set which is a preferred embodiment of a flat panel display apparatus according to the present invention.

FIG. 1 is a block diagram for showing a circuit configuration of a plasma display panel television set which is a preferred embodiment of a flat panel display apparatus according to the present invention. A PDP-TV includes a video processing section for converting an NTSC composite video signal into a signal form which is adapted to the PDP-TV system, and a driving circuit section for displaying processed video data via a panel thereof.

Broadly speaking, a composite video signal which is received via an antenna, is analog-processed by an audio/video (referred to as "A/V") signal processing section 10, and an analog-processed signal is then digitized to a prescribed video signal by an analog-to-digital converter (referred to as "ADC") 12. Afterwards, while passing through a data rearranging section 14a, memory section 14b and data interfacing section 14c of a data processing section 14, this video data is converted into a data stream which is adapted to a contrast-processing characteristics of the PDP, and a converted data stream is then provided to an address electrode driving section 20 and 22.

Under the control of a timing control section 16, a high-voltage generating section 18 provides a high-voltage control pulse which is required by an upper address electrode driving section 20, a lower address electrode driving section 22, a scan electrode driving section 24 and a maintenance electrode driving section 26, and a power supplying section 30 inputs an AC voltage (referred to as "ACV") to produce all of DC voltages (referred to as "DCV's") which are required by a whole system.

A/V signal processing section 10 inputs the NTSC composite video signal to separate an analog RGB and a horizontal or vertical synchronizing signal H.V SYNC, and produces an average picture level (referred to as "APL"), which corresponds to an average value of a luminance signal, and, which is then provided to ADC 12.

The interlaced scanning system is adopted for the NTSC composite video signal whose one frame consists of two fields of respectively even-and odd-numbered sequences, and whose horizontal and vertical synchronizing signals have frequencies of 15.73 [KHz] and 60 [Hz], respectively. An audio signal which is separated from the composite video signal is directly provided to a speaker via an audio amplifier.

ADC 12 inputs the analog RGB signal to convert an inputted analog RGB signal into digital data, and provides converted digital data to data processing section 14. Here, the digital data is video data whose signal form is converted for a brightness improvement of the PDP-TV system. ADC 12 amplifies the analog RGB signal and the APL signal to have signal levels thereof which are adapted to a quantization, and converts the vertical and horizontal synchronizing signals to have prescribed phases thereof. Also, ADC 12 generates a clock by using a phase-locked loop (referred to as "PLL") in order to use a sampling clock as a clock which is synchronized with an input synchronizing signal.

The PLL compares a phase of a variable pulse from a loop with a phase of an input synchronizing signal, and provides a clock which is synchronized with the input synchronizing signal. In the case where the clock, which is not synchronized with the input synchronizing signal, is used, a vertical linearity of a picture to be displayed is not ensured.

Also, ADC 12 sets vertical and horizontal positions of a sampling area. In a vertical position section, only lines which include the video signal among the input signals are set. In a horizontal position section, only time which includes the video signal among the lines which is set to the vertical position, is set. Both the vertical position section and the horizontal position section are a reference for a sampling. As illustrated in Table 1, a total of 480 lines is selected in the 240 lines of units for the vertical position section. The horizontal position section has to correspond to a time interval in which at least 853 sampling clocks can exists per line.

Also, ADC 12 maps the RGB data to data which coincides with a brightness characteristic of the PDP and outputs a mapped RGB data. Namely, ADC 12 includes a read only memory (referred to as "ROM") which has a plurality of vector tables recorded therein, and then maps an optimal vector table read from the ROM 1 to 1 in accordance with a digitized APL data to provide an improved form of RGB data to data processing section 14.

TABLE 1

| items | 1 frame | | remarks |
|---|---|---|---|
| | odd | even | |
| a total line | 1H–262.5H | 262.5H–525H | NTSC TV |
| an active line | 22H–263H | 284H–525H | |
| a selective line | 23H–262H | 285H–524H | |

In order to process the contrast of the PDP, data rearranging section 14a of data processing section 14 is required to reconfigure the video data into a plurality of subfields, and then to rearrange data bits from the most significant bit (referred to as "MSB") to the least significant bit (referred to as "LSB"). Data rearranging section 14a performs rearrangement so that the video data provided in parallel may be stored at a location specified by an address of a frame memory as bits having the same weight.

Here, in order to distinguish data for the upper address electrode from data for the lower address electrode, there is configured one word in which among respective 8 1-bit data with respect to rearranged red and blue, 4 1-bit data in an odd-numbered sequence are placed at an upper bit while 4 1-bit data in an even-numbered sequence are placed at a lower bit, and in which among 8 1-bit data with respect to a rearranged green, 4 1-bit data in an odd-numbered sequence are placed at a lower bit while 4 1-bit data in an even-numbered sequence are placed at an upper bit.

Because memory section 14b of data processing section 14 divides one field into eight subfields for the contrast processing of the PDP, and reads in series the video data corresponding to respective subfields in harmony with an arrangement order of the electrodes to provide the read video data to data interfacing section 16, a read order is quite different from a write order structurally.

Data interfacing section 14c rearranges the RGB data from memory section 14b in harmony with an arrangement of an RGB pixel of a display section 28 and provides a rearranged RGB data to an address driving integrated circuit (referred to as "IC"). Namely, data interfacing section 14c provisionally stores the RGB data from memory section 14b and then respectively provides read RGB data to upper and lower address electrode driving sections 20 and 22 in a data form which is required by upper and lower address electrode driving sections 20 and 22.

High-voltage generating section 18 combines the DC high-voltages with each other in accordance with a control pulse having various logic levels from timing control section 16, and produces the high-voltage control pulse which is required by upper address electrode driving section 20, lower address electrode driving section 22, scan electrode driving section 24, and maintenance electrode driving section 26, which enables the PDP to be driven. Upper and lower address electrode driving sections 20 and 22 adequately heighten a voltage level of the data from data interfacing section 14c and a selective entry can be executed into display section 28.

Namely, a driving method for the contrast processing of the PDP according to the present invention, first, divides one field into a plurality of subfields, i.e., 256 contrast—8 subfields, and enters the video data corresponding to respective subfields in the line of unit into display section 28 via upper and lower address electrode driving sections 20 and 22. The method sets a number of a discharge maintenance pulses to a smaller one in an order starting from the subfield having MSB data entered therein to the subfield having LSB data entered therein, and comes to perform the contrast-processing on the basis of a total discharge maintenance period according to a combination therebetween.

Upper and lower address electrode driving sections 20 and 22 includes 20 driving IC's which have both 4-bit input pins and 64-bit output pins. Thus, respective driving sections load the data corresponding to one line alternately in an even or an odd order over 32 times total in 40 units from data interfacing section 14c, and then drive one line of electrodes simultaneously.

The same data is displayed twice in even and odd fields and thereby eliminates a flickering which accompanies a non-interlacing scan. A driving order of the divided subfields is described as follows.

1) An entry and elimination of a whole screen

In order to eliminate a wall electric charge which remains at a selected pixel after a discharge maintenance of a previous subfield, the wall electric charge is entered into a whole pixel for a short time which is not enough to be visible, and the whole pixel is then eliminated to eliminate all of the remaining wall electric charges and an initialization is achieved.

2) The entry of data

While shifting a scan pulse in sequence at a scan electrode, a relevant data is entered in the line of unit via an address electrode, and thereby forming the wall electric charge at a pixel which is intended to be discharged.

3) A maintenance of a discharge

The discharge of a pixel having the wall electric charge which is formed therein while alternately applying the maintenance pulse between the maintenance electrode and the scan electrode is initiated and is then maintained. At this time, because there exists a possibility of a peripheral pixel, which is entered, influencing another pixel, which is not entered, to produce an erroneous discharge, an elimination of a narrow range is performed every time after applying the maintenance pulse, and a correct discharge is then performed.

Figure 2:
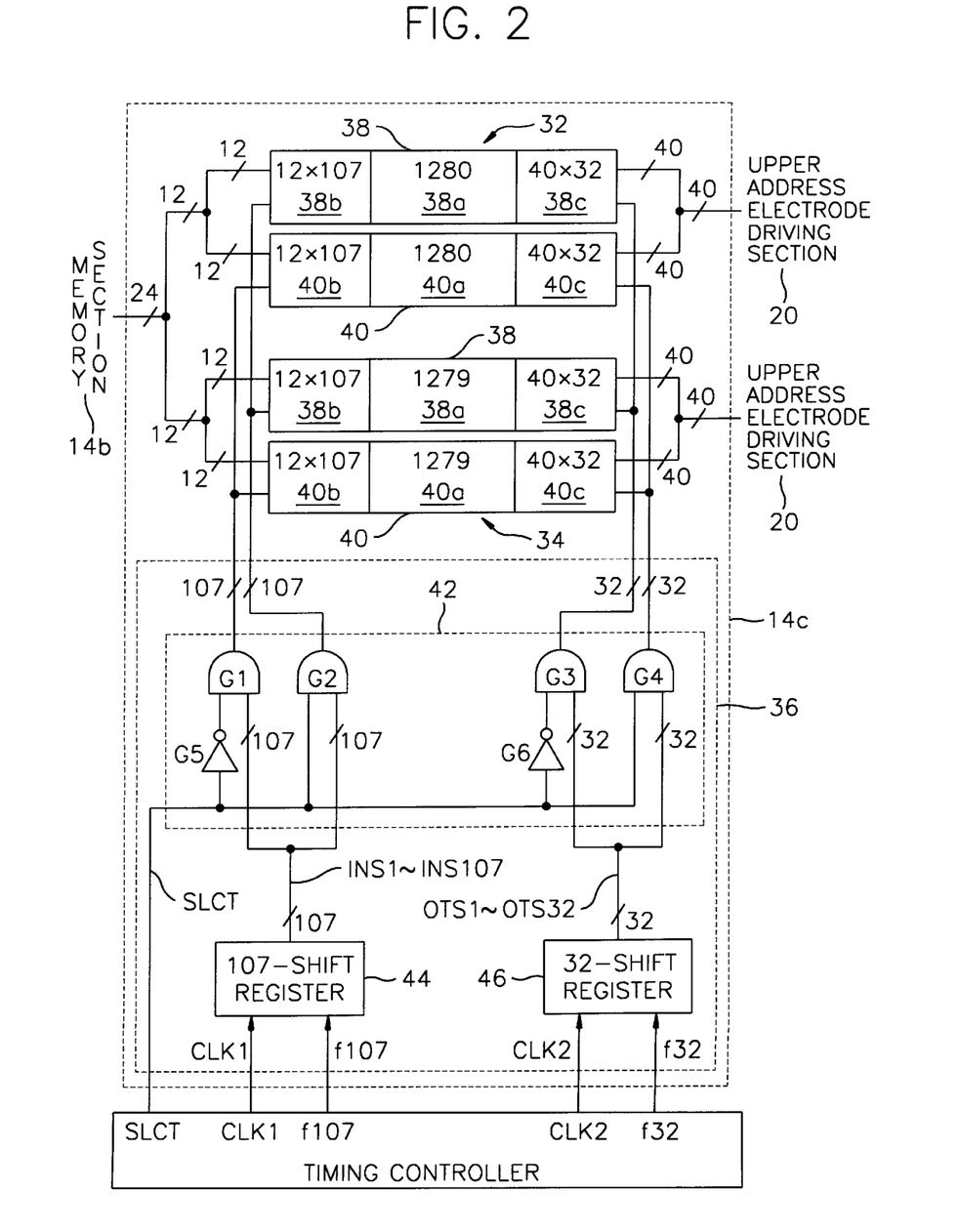
FIG. 2 is a block diagram for showing a circuit configuration of a preferred first embodiment of a data interfacing section according to the present invention.

FIG. 2 is a block diagram for showing a circuit configuration of a preferred first embodiment of a data interfacing section according to the present invention.

Data interfacing section 14c comprises upper and lower data interfacing sections 32, 34 and an input/output control section 36. Respective data interfacing sections 32, 34 consist of a couple of temporality storing sections 38, 40.

Respective temporality storing sections 38, 40 comprise a storing areas 38a, 40a for temporarily storing 1280 pixel data, an input selecting sections 38b, 40b input 12 pixel data over 107 times into storing areas 38a, 40a in response to 107 input selecting control signals INS1–INS107 which are sequentially generated, and output selecting sections 38c, 40c output 1280 pixel data which is stored in storing areas 38a, 40a by 40 units over 32 times in response to 32 output selecting control signals OTS1–OTS32 which are sequentially generated.

Input/output control section 36 comprises an operation control section 42, a first control signal generating section 44, and a second control signal generating section 46.

Figure 3:
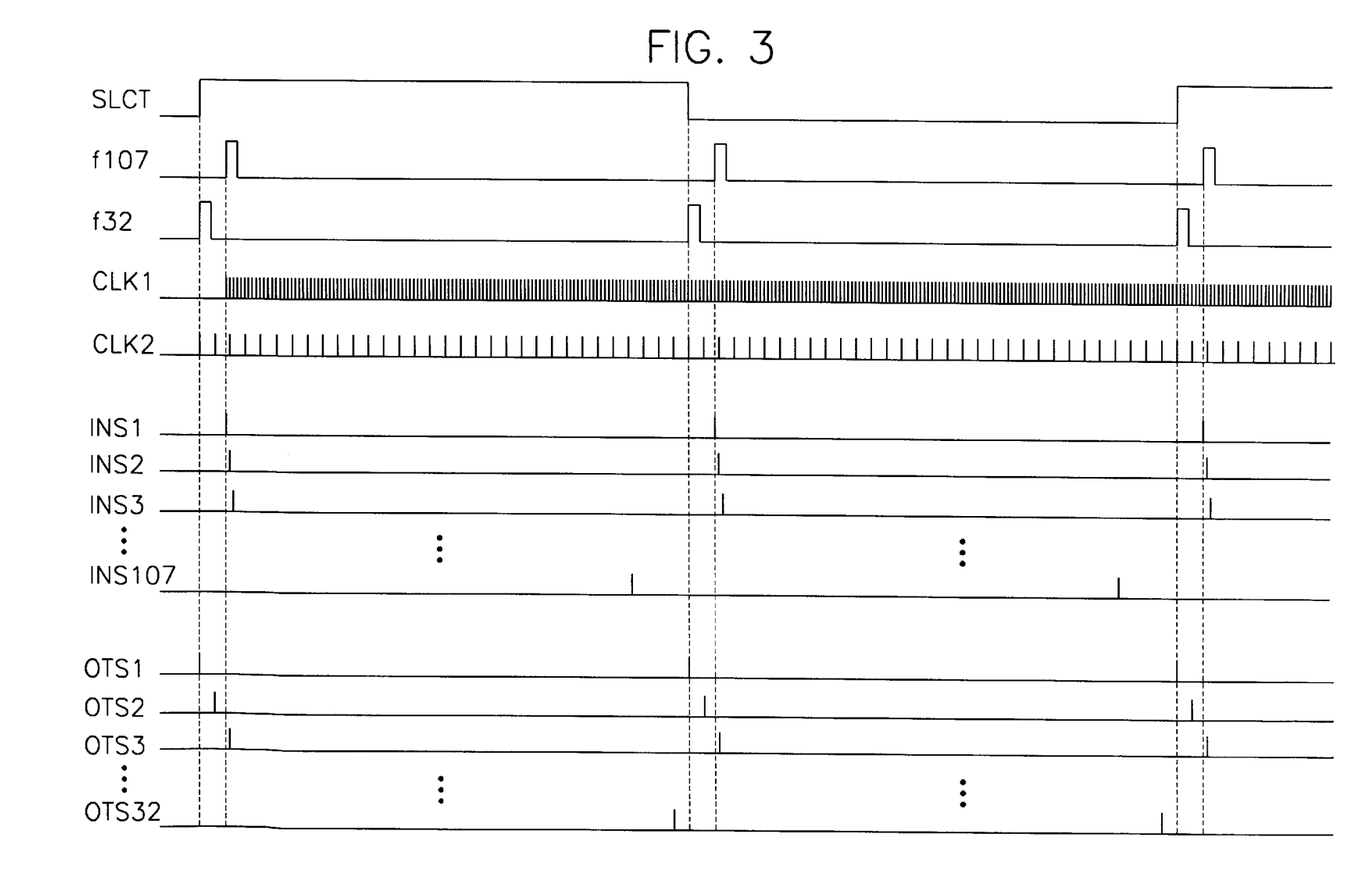
FIG. 3 is a view for showing a waveform of each section of FIG. 2.

First control signal generating section 44 comprises 107 shift registers and receives a first clock signal CLK1 and a first reference signal f107 of 50 [MHz] shown in FIG. 3 from timing control section 16. Also, first control signal generating section 44 shifts first reference signal f107 over 107 times in response to first clock signal CLK1 and generates 107 input selecting control signals INS1–INS107 shown in FIG. 3.

Second control signal generating section 46 comprises 32 shift registers and receives a second clock signal CLK2 and a second reference signal f32 of 12.5 [MHz] shown in FIG. 3 from timing control section 16. Also, second control signal generating section 46 shifts second reference signal f32 over 32 times in response to second clock signal CLK2 and generates 32 output selecting control signals OTS1–OTS32 shown in FIG. 3.

Operation mode control section 42 comprises 4 AND gates G1–G4 and 2 NOT gates G5, G6. Operation mode control section 42 supplies control signal from first and second control signal generating sections 44, 46 to couple of temporality storing sections 38, 40 for a data input/output mode to be alternately executed in couple of temporality storing section 38, 40 in response to an input/output mode control signal SLCT.

Accordingly, in a high section of input/output mode control signal SLCT, 107 input selecting control signals INS1–INS107 are provided to an upper temporarily storing section 38 of upper and lower data interfacing sections 32, 34 via AND gate G2 in order to store 1280 pixel data supplied from memory section 14b. At the same time, 32 output selecting control signals OTS1–OTS32 are provided to a lower temporarily storing section 40 of upper and lower data interfacing sections 32, 34 via AND gate G4 in order to output the stored 1280 pixel data by 40 units over 32 times.

In a low section of input/output mode control signal SLCT, on the contrary, a storing operation and an outputting operation is executed.

Input/output mode control signal SLCT is either a pulse signal having 480 lines scan frequency provided by timing control section 16 or a pulse signal having 480 lines scan frequency provided by memory section 14b.

Hereat, generating the input/output mode control signal SLCT by inputting read address clock of memory section 14b contributes in making the logic configuration of timing control section 16 simpler than generating the input/output mode control signal in accordance with the read timing of the memory section at timing control section 16.

Figure 4:
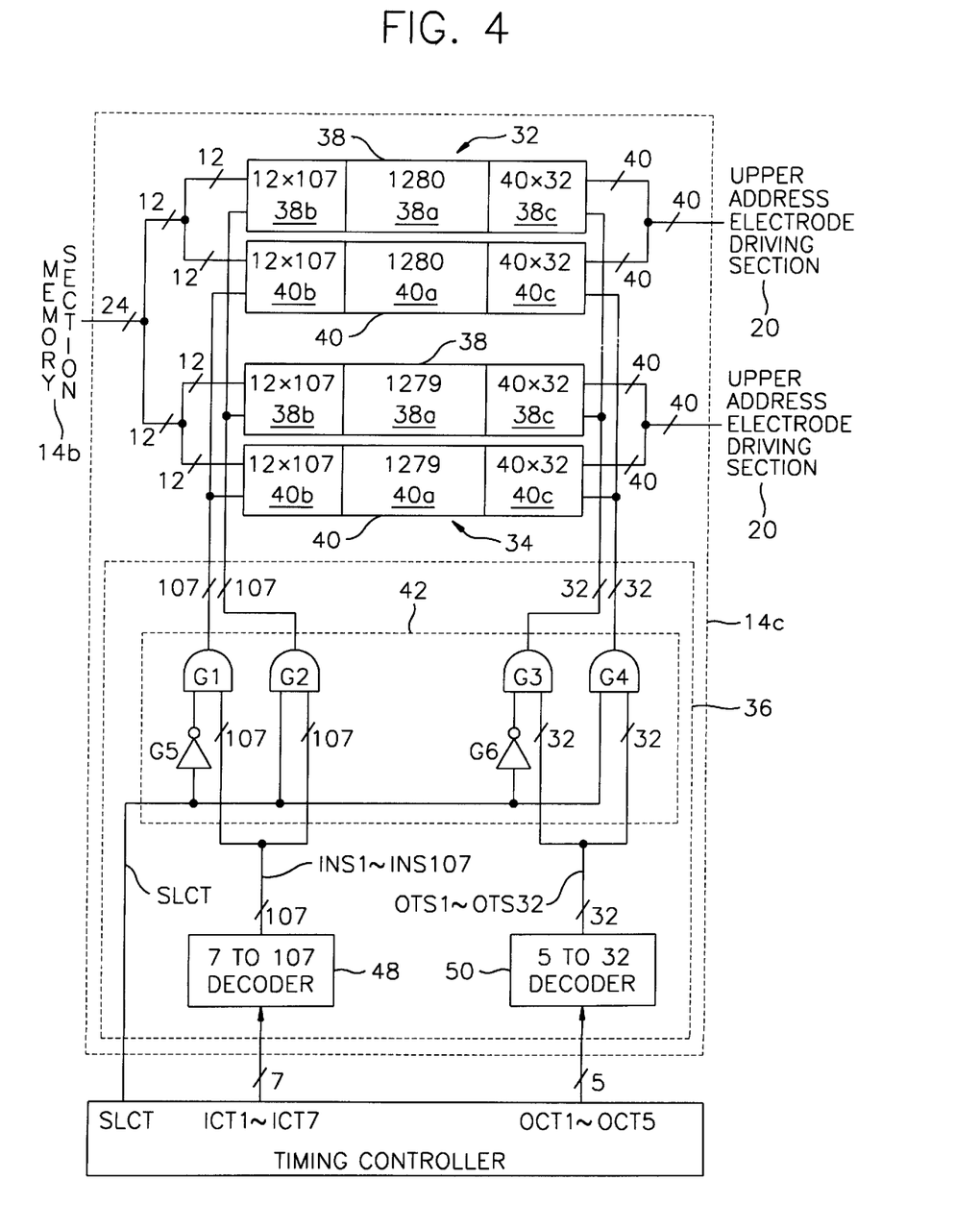
FIG. 4 is a block diagram for showing a circuit configuration of a preferred second embodiment of a data interfacing section according to the present invention.

FIG. 4 is a block diagram for showing a circuit configuration of a preferred second embodiment of a data interfacing section according to the present invention.

When compared to the above described first embodiment, in the second embodiment, the circuit configurations of the first and the second control signal generating sections are different from each other but the other configurations are the same. Namely, in the second embodiment, first and second control signal generating sections 48, 50 are composed of decoder.

Namely, first control signal generating section 48 comprises 7 to 107 decoder. First control signal generating section 48 receives 107 first count values ICT1–ICT7 which are sequentially generated from timing control section 16 and generates 107 input selecting control signals INS1–INS107 by decoding 107 first count values ICT1–ICT7.

Second control signal generating section 50 comprises 5 to 32 decoder. Second control signal generating section 50 receives 32 second count values OCT1–OCT5 which are sequentially generated from timing control section 16 and generates 32 output selecting control signals OTS1–OTS32 by decoding 32 second count values OCT1–OCT5.

Accordingly, in the second embodiment, the first count signal of 7 bits, the second count signal of 5 bits, and the input/output mode control signal are directly inputted from the timing controller. Therefore, in the second embodiment, a number of input pins for the control signal can be reduced from 139 to 13.

Figure 5:
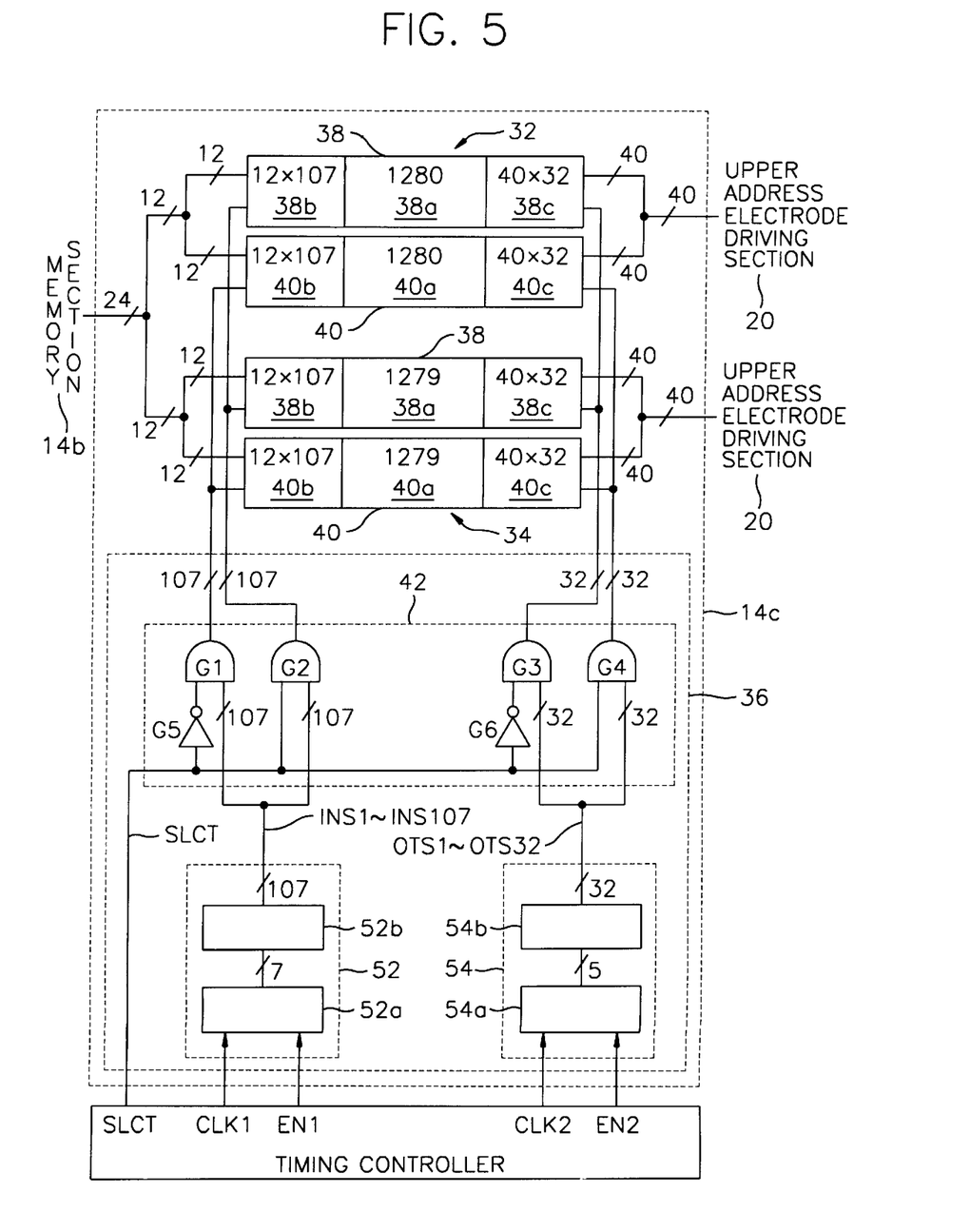
FIG. 5 is a block diagram for showing a circuit configuration of a preferred third embodiment of a data interfacing section according to the present invention.

FIG. 5 is a block diagram for showing a circuit configuration of a preferred third embodiment of a data interfacing section according to the present invention.

When compared to the above described second embodiment, in the third embodiment, the circuit configuration of the first and the second control signal generating section is different but the other configurations are the same. Namely, in the third embodiment, respective first and second control signal generating sections 52, 54 are composed of a counter and a decoder.

Namely, first control signal generating section 52 comprises 7-bit counter 52a and 7 to 107 decoder 52b. 7-bit counter 52a receives first clock signal CLK1 and first enable signal EN1 from timing control section 16. Also, 7-bit counter 52a counts first clock signal CLK1 in response to first enable signal EN1 and generates 107 input selecting control signals INS1–INS107 by decoding the counted value of first clock signal CLK1.

Second control signal generating section 54 comprises 5-bit counter 54a and 5 to 32 decoder 54b. 5-bit counter 54a receives second clock signal CLK2 and second enable signal EN2 from timing control section 16. In addition, 5-bit counter 54a counts second clock signal CLK2 in response to second enable signal EN2 and generates 32 output selecting control signals OTS1–OTS32 by decoding the counted value of second clock signal CLK2.

Accordingly, in the third embodiment, the first and the second clock signals, the first and the second enable signals, and the input/output mode control signal are directly inputted from the timing controller. Therefore, in the third embodiment, a number of input pins for control signal can be reduced from prior 139 to 5.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. An apparatus for interfacing L pixel data corresponding to 1 line inputted from a memory section to an upper and a lower address electrode driving section, respectively, in response to a control signal supplied from a timing control section, said apparatus comprising:

an upper and a lower data interfacing section, and an input/output control section;

wherein each of said upper and said lower data interfacing sections comprises:

a couple of temporality storing sections comprising a storing area for temporarily storing L/2 pixel data;

an input selecting means for inputting 3N pixel data into said storing area over M (where M is a least integer which is greater than a quotient of L divided by 3N) times in response to M input selecting control signals which are sequentially generated; and an output selecting means for outputting the L/2 pixel data stored in said storing area by P units over Q $\{=(L/2)/P\}$ times in response to Q output selecting control signals which are sequentially generated;

wherein L, M, N, P, and Q are integers;

wherein said input/output control section comprises:

a first control signal generating section for receiving a first clock signal and a first reference signal from said timing control section and for generating the M input selecting control signals by shifting the first reference signal over M times in response to the first clock signal;

a second control signal generating section for receiving a second clock signal and a second reference signal from said timing control section and for generating the Q output selecting control signals by shifting the second reference signal over Q times in response to the second clock signal; and an operation mode control section for supplying the control signal from said first and said second control signal generating sections to said couple of temporality storing sections for a data input/output mode to be alternately executed in said couple of temporality storing sections in response to an input/output mode control signal.

2. The apparatus for interfacing L pixel data as claimed in claim 1, wherein said L, M, N, P, and Q are 2559, 107, 4, 40, and 32, respectively.

3. The apparatus for interfacing L pixel data as claimed in claim 2, wherein the first clock signal 50 MHz and the second clock signal is 12.5 MHz, respectively.

4. The apparatus for interfacing L pixel data as claimed in claim 3, wherein said first control signal generating section comprises 107 shift registers which generates the 107 input selecting control signals by shifting the first reference signal over 107 times in response to the first clock signal.

5. The apparatus for interfacing L pixel data as claimed in claim 3, wherein said second control signal generating section comprises 32 shift registers which generates the 32 output selecting control signals by shifting the second reference signal over 32 times in response to the second clock signal.

6. The apparatus for interfacing L pixel data as claimed in claim 1, wherein the input/output mode control signal is a pulse signal having 480 lines scan frequency supplied from said timing control section.

7. The apparatus for interfacing L pixel data as claimed in claim 1, wherein the input/output mode control signal is a pulse signal having 480 lines scan frequency supplied from said memory section.

8. An apparatus for interfacing L pixel data corresponding to 1 line inputted from a memory section to an upper and a lower address electrode driving section, respectively, in response to a control signal supplied from a timing control section, said apparatus comprising:

an upper and a lower data interfacing section, and an input/output control section;

wherein each of said upper and said lower data interfacing sections comprises:

a couple of temporality storing sections comprising a storing area for temporarily storing L/2 pixel data;

an input selecting means for inputting 3N pixel data into said storing area over M (where M is a least integer which is greater than a quotient of L divided by 3N) times in response to M input selecting control signals which are sequentially generated; and an output selecting means for outputting the L/2 pixel data stored in said storing area by P units over Q $\{=(L/2)/P\}$ times in response to Q output selecting control signals which are sequentially generated;

wherein L, M, N, P, and Q are integers;

wherein said input/output control section comprises:

a first control signal generating section for decoding M first count values which are sequentially generated from said timing control section and for generating the M input selecting control signals;

a second control signal generating section for decoding Q second count values which are sequentially generated from said timing control section and for generating the Q output selecting control signals; and an operation mode control section for supplying the control signal from said first and said second control signal generating sections to said couple of temporality storing sections for a data input/output mode to be alternately executed in said couple of temporality storing sections in response to an input/output mode control signal.

9. The apparatus for interfacing L pixel data as claimed in claim 8, wherein the L, M, N, P, and Q are 2559, 107, 4, 40, and 32, respectively.

10. The apparatus for interfacing L pixel data as claimed in claim 9, wherein the first count value is 7 bits and the second count value is 5 bits, respectively.

11. The apparatus for interfacing L pixel data as claimed in claim 10, wherein said first control signal generating section comprises 7 to 107 decoder which generates the 107 input selecting control signals by decoding the first count value of 7 bits.

12. The apparatus for interfacing L pixel data as claimed in claim 10, wherein said second control signal generating section comprises 5 to 32 decoder which generates the 32 output selecting control signals by decoding the second count value of 5 bits.

13. The apparatus for interfacing L pixel data as claimed in claim 8, wherein the input/output mode control signal is a pulse signal having 480 lines scan frequency supplied from said timing control section.

14. The apparatus for interfacing L pixel data as claimed in claim 8, wherein the input/output mode control signal is a pulse signal having 480 lines scan frequency supplied from said memory section.

15. An apparatus for interfacing L pixel data corresponding to 1 line inputted from a memory section to an upper and a lower address electrode driving section, respectively, in response to a control signal supplied from a timing control section, said apparatus comprising:

an upper and a lower data interfacing section, and an input/output control section;

wherein each of said upper and said lower data interfacing sections comprises:

a couple of temporality storing sections comprising a storing area for temporarily storing L/2 pixel data;

an input selecting means for inputting 3N pixel data into said storing area over M (where M is a least integer which is greater than a quotient of L divided by 3N) times in response to M input selecting control signals which are sequentially generated; and an output selecting means for outputting the L/2 pixel data stored in said storing area by P units over Q $\{=(L/2)/P\}$ times in response to Q output selecting control signals which are sequentially generated;

wherein L, M, N, P, and Q are integers;

wherein said input/output control section comprises:

a first control signal generating section for receiving a first clock signal and a first enable signal from said timing control section and for counting the first clock signal in response to the first enable signal and for generating the M input selecting control signals by decoding the counted value of the first clock signal;

a second control signal generating section for receiving a second clock signal and a second enable signal from said timing control section and for counting the second clock signal in response to the second enable signal and for generating the Q output selecting control signals by decoding the counted value of the second clock signal; and an operation mode control section for supplying the control signal from said first and said second control signal generating sections to said couple of temporality storing sections for a data input/output mode to be alternately executed in said couple of temporality storing sections in response to an input/output mode control signal.

16. The apparatus for interfacing L pixel data as claimed in claim 15, wherein the L, M, N, P, and Q are 2559, 107, 4, 40, and 32, respectively.

17. The apparatus for interfacing L pixel data as claimed in claim 16, wherein the first clock signal 50 MHz and the second clock signal is 12.5 MHz, respectively.

18. The apparatus for interfacing L pixel data as claimed in claim 17, wherein said first control signal generating section comprises:

a 7-bit counter for counting the first clock signal in response to the first enable signal and for outputting the counted value; and a decoder for decoding the counted value and for generating the 107 input selecting control signals.

19. The apparatus for interfacing L pixel data as claimed in claim 17, wherein said second control signal generating section comprises;

a 5-bit counter for counting the second clock signal in response to the second enable signal and for outputting the counted value; and a decoder for decoding the counted value and for generating the 32 output selecting control signals.

20. The apparatus for interfacing L pixel data as claimed in claim 15, wherein the input/output mode control signal is a pulse signal having 480 lines scan frequency supplied from said timing control section.

21. The apparatus for interfacing L pixel data as claimed in claim 15, wherein the input/output mode control signal is a pulse signal having 480 lines scan frequency supplied from said memory section.

* * * * *